(No Model.) 2 Sheets—Sheet 2.

C. OESTERLING.
GATE.

No. 438,939. Patented Oct. 21, 1890.

WITNESSES:

INVENTOR:
Charles Oesterling
BY Munn & Co
ATTORNEYS

UNITED STATES PATENT OFFICE.

CHARLES OESTERLING, OF BARNHART'S MILLS, PENNSYLVANIA.

GATE.

SPECIFICATION forming part of Letters Patent No. 438,939, dated October 21, 1890.

Application filed July 23, 1890. Serial No. 359,632. (No model.)

*To all whom it may concern:*

Be it known that I, CHARLES OESTERLING, of Barnhart's Mills, in the county of Butler and State of Pennsylvania, have invented a new and useful Improvement in Gates, of which the following is a full, clear, and exact description.

My invention relates to swinging gates, and has for its object the production of a gate which will be simple in construction, easy to operate, and strong and durable in use; and the invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1:
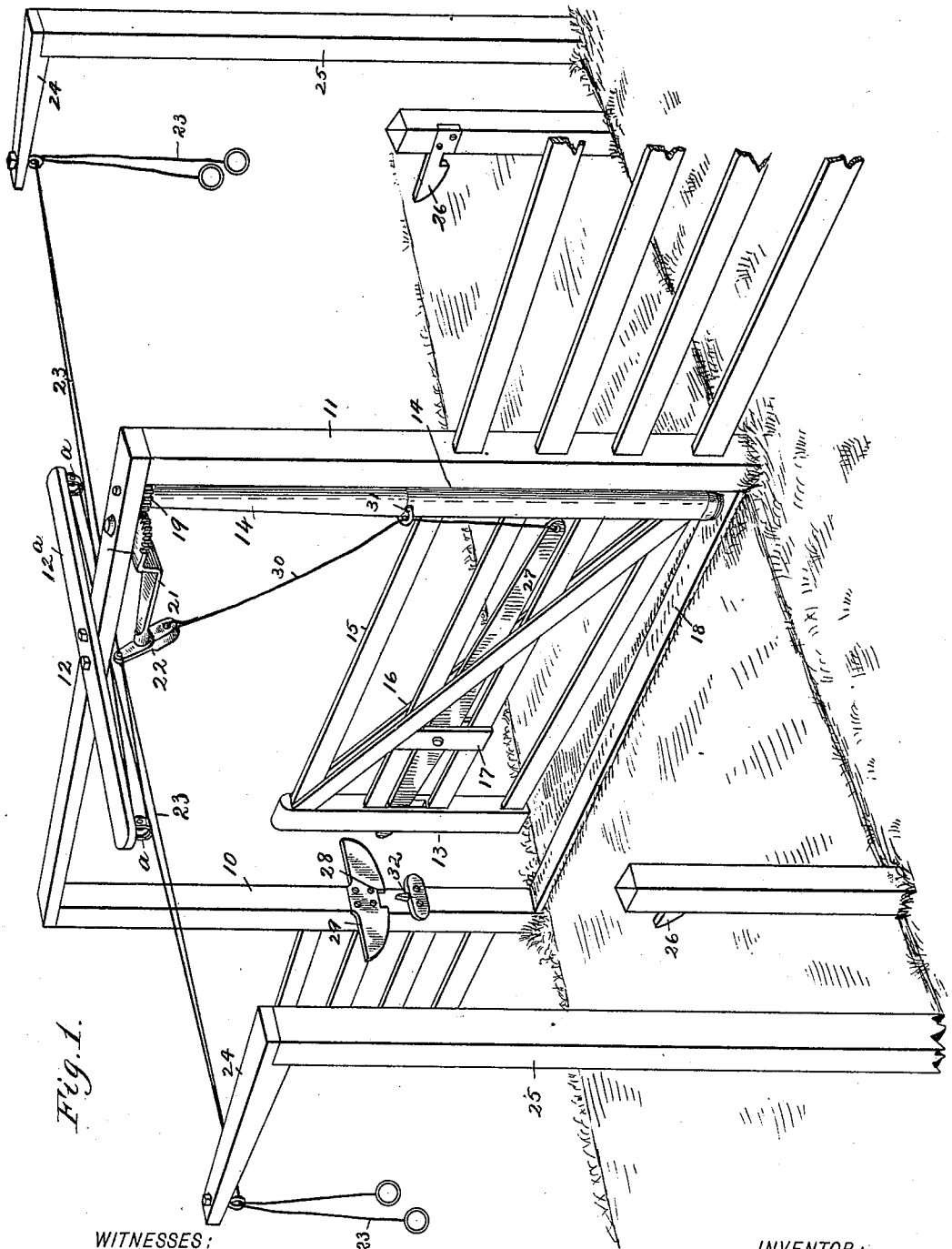
Figure 2:
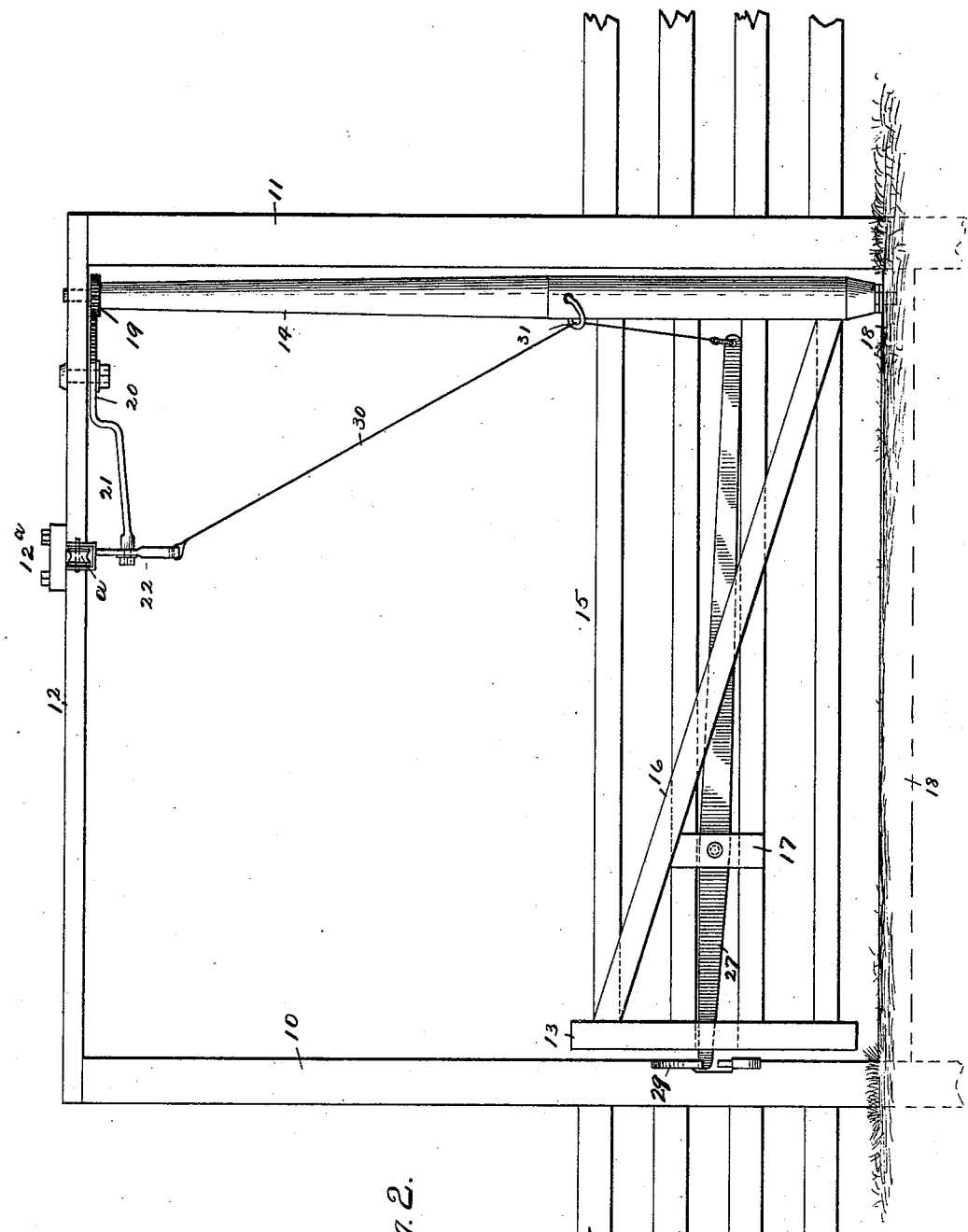

Figure 1 is a perspective view of the gate partially open, and Fig. 2 is a side elevation thereof closed.

The latch-post 10 and the opposed gate-post 11 are connected at the top by a cross-bar 12. The gate consists of two end bars 13 and 14, the end bar 14 being utilized as the swing-bar, and made to extend some distance above and slightly below the body 15 of the gate, which preferably consists, further, of a series of slats uniting the end bars, the longitudinal slats being ordinarily braced by two parallel diagonal slats 16. The central slats near the end bar 13 of the gate-body have attached at opposite sides parallel vertical slats 17.

The gate may be swung by hinges in the ordinary manner to the gate-post 11, but, preferably, the swing-bar 14 at its lower end is pivoted or held to turn in a socket in a sill 18, as illustrated, and the upper end of the swing-bar is pivoted in any suitable or approved manner in the cross-bar 12, the said upper end of the swing-bar being provided with an attached pinion 19. The pinion 19 meshes with a toothed segment 20, also pivotally attached to the under face of the cross-bar 12, which segment is provided with a horizontal arm 21, extending, preferably, in the direction of the latch-post 10 of the gate. The arm 21 of the segment has pivoted to its extremity a trip-bar 22, the said trip-bar being fulcrumed at or near its center. The trip-bar normally extends at a right angle to the upper and lower faces of the segment-arm 21, and to the upper end of the trip-bar two cords, ropes, or chains 23 are attached at each side, which ropes or chains lead in opposite directions through suitable guides attached to the cross-arms 24 of standards or posts 25, located one at each side of the swing-post 11 of the gate and, preferably, in alignment therewith. One of each set of cords is passed directly through the guide of the cross-arm facing its point of attachment, and the other cords are carried over pulleys *a* to the cross-arms farthest away from their points of attachment to the trip-bar, as is best shown in Fig. 1. The pulleys are located at each end of a beam 12ª, secured transversely upon the cross-beam 12. Between the swing-bar of the gate and the standards 25 short posts are erected, having secured thereto keepers 26, adapted to retain the gate in an open position.

The gate-latch 27 consists of a bar or slat located longitudinally, preferably between the two central slats of the gate-body, the outer end of the latch being made to pass through a suitable aperture in the outer end bar 13 of the gate, and the head of the latch is adapted to engage, when the gate is closed, with a recess 28, produced in the lower side of a keeper 29, attached to the inner face of the post 10. The latch is pivoted to the upright slats 17, and the greater length of the latch is at the rear of its fulcrum. Thus the weight of the longer end normally keeps the shorter end in an elevated position, and when the gate is closed said weight keeps the latch in the recess 28 of the keeper 29.

To the lower end of the trip-bar 22 one end of a cord, rope, or chain 30 is secured, which cord, rope, or chain passes through a suitable guide staple or ring 31, attached to the swing-bar 14 of the gate, and the other end of the cord is securely fastened to the inner extremity of the latch 27.

In operation if a team is approaching the gate from the right the driver of the team by drawing down upon one of the right-hand cords 23 causes the upper end of the trip-bar to turn in the direction of the right and to draw the arm 21 of the segment in the same direction, and the segment, operating upon the pinion of the swing-bar 14, opens the gate to the left, since the very moment that the upper end of the trip-bar is drawn to the right and the lower end forced to the left tension will be exerted upon the cord 30, attached to the lower extremity of the trip-bar, whereby the inner extremity of the gate-latch is elevated and the head disconnected from the keeper 29. When the gate is swung back to the left, the latch engages with a keeper 26, located at that side of the swing-bar. After having passed through it the gate is closed by drawing downward upon one of the left-hand cords 23, whereupon the position of the trip-bar 22 is reversed, and the gate is forced to swing back to its normal position. A stop 32 is located on the post 10 below the keeper. By providing two draw-cords at each side of the gate, the gate, if opened to the left, for instance, and permitted to remain open, may be closed by a person standing upon the left hand of the gate without trouble.

If in practice it is found desirable, a spring may be employed to elevate the shorter end of the latch; but ordinarily the weight of the longer end is sufficient.

Having thus described my invention, I claim as new and desire to secure by Letters Patent—

1. The combination, with a gate having one end post extended vertically, supports to which said end post is pivoted, and a latch pivoted on the gate, of a pinion on the end post, a toothed segment pivoted on the gate-support and provided with a horizontal arm, a trip-bar centrally pivoted on said arm, a flexible connection between the latch and trip-bar, and means for manipulating the trip-bar, substantially as set forth.

2. The combination, with gate-posts, a cross-bar connecting the same, a toothed segment pivoted to the under side of the cross-bar and provided with an attached horizontal arm, and a trip-bar fulcrumed near its center to the end of the said arm, of a gate one end post whereof is pivoted at both extremities and provided at its upper end with an attached pinion meshing with the toothed segment, a latch horizontally pivoted in the gate forward of its center, a connection between the inner longer end of the latch and the trip-bar, and means for manipulating the trip-bar, as and for the purpose stated.

3. The combination, with gate-posts, a cross-bar connecting the same, a segment pivoted to the cross-bar and provided with a horizontal arm, and a trip-bar pivoted near its center to the said arm, of a gate one end post whereof is pivoted in a socket at its lower end and in the cross-bar at its upper end, a pinion carried by the pivoted end bar and meshing with the said segment, a latch pivoted at one side of its center in the gate, cords attached to the upper end of the trip-bar, leading in opposite directions, and a cord attached to the lower end of the trip-bar and the extremity of the gate-latch at its longer end, substantially as shown and described.

CHARLES OESTERLING.

Witnesses:
STEPHEN CUMMINGS,
ED. S. RIDDLE.